(12) United States Patent
Allen et al.

(10) Patent No.: US 11,698,113 B1
(45) Date of Patent: Jul. 11, 2023

(54) CLUTCH SEAL PLATE SEALED TO TORQUE CONVERTER

(71) Applicant: Schaeffler Technologies AG & Co. KG, Herzogenaurach (DE)

(72) Inventors: Natalie Allen, Richfield, OH (US); Brandon Heitger, Massillon, OH (US); David Avins, Burbank, OH (US); Nigel Gurney, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/940,178

(22) Filed: Sep. 8, 2022

Related U.S. Application Data

(60) Provisional application No. 63/388,754, filed on Jul. 13, 2022.

(51) Int. Cl.
*F16D 25/12* (2006.01)
*F16D 25/08* (2006.01)
*F16H 41/24* (2006.01)

(52) U.S. Cl.
CPC ............. *F16D 25/12* (2013.01); *F16D 25/08* (2013.01); *F16H 41/24* (2013.01); *F16D 2300/08* (2013.01); *F16D 2300/12* (2013.01)

(58) Field of Classification Search
None
See application file for complete search history.

(56) References Cited

U.S. PATENT DOCUMENTS

| | | | |
|---|---|---|---|
| 11,111,970 B1 | 9/2021 | Wurst et al. | |
| 11,193,569 B1* | 12/2021 | Nelson | F16H 45/02 |
| 2007/0251788 A1* | 11/2007 | Heck | F16H 45/02 192/3.3 |
| 2013/0056319 A1* | 3/2013 | Lindemann | F16H 45/02 60/330 |
| 2015/0167809 A1* | 6/2015 | Simon | F16H 45/02 60/331 |
| 2019/0084401 A1* | 3/2019 | Moasherziad | F16H 57/00 |
| 2022/0170538 A1* | 6/2022 | Bernal | F16H 41/24 |

* cited by examiner

*Primary Examiner* — Timothy Hannon

(57) ABSTRACT

A hybrid module includes a torque converter and a clutch assembly. The torque converter includes a front cover. The clutch assembly includes a piston axially spaced from the front cover. The piston is axially slidable to engage the clutch assembly. The clutch assembly further includes a seal plate non-rotatably connected to the front cover and sealed to the piston. A seal is compressed between the seal plate and the front cover.

20 Claims, 2 Drawing Sheets

CLUTCH SEAL PLATE SEALED TO TORQUE CONVERTER

CROSS-REFERENCE TO RELATED APPLICATIONS

This application claims the benefit of U.S. Provisional Patent Application No. 63/388,754, filed Jul. 13, 2022, the disclosure of which is incorporated in its entirety by reference herein.

TECHNICAL FIELD

The present disclosure relates generally to a hydraulically applied clutch, and more specifically to a hydraulically applied clutch with a seal plate sealed to a torque converter.

BACKGROUND

Hybrid modules are generally known. Often, it is a challenge to package and/or fit all the desired components, e.g., an e-motor, crank damper, torque converter, torque converter clutch, disconnect clutch, and resolver within the hybrid module architecture due to axial and radial constraints. Due to limited spacing for within a hybrid module envelope, it is desirable to have alternative designs and configurations to fit all the necessary components within the hybrid module while still meeting durability and performance requirements.

SUMMARY

Embodiments disclosed herein provide a hybrid module including a torque converter and a clutch assembly. The torque converter includes a front cover. The clutch assembly includes a piston axially spaced from the front cover. The piston is axially slidable to engage the clutch assembly. The clutch assembly further includes a seal plate non-rotatably connected to the front cover and sealed to the piston. A seal is compressed between the seal plate and the front cover.

In embodiments, the seal plate may include a radial portion and an axial portion extending axially therefrom. The seal may be compressed by the radial portion. The radial portion may include an axial side facing the front cover and having a groove. The seal may be disposed in the groove. The radial portion may include a further axial side opposite the axial side and facing the piston. The further axial side may include a step extending axially therefrom. The step may be configured to limit axial movement of the piston towards the front cover. The step may be radially aligned with the groove. The radial portion may be non-rotatably connected to the front cover via a connector. The step may be disposed radially outside of the connector. The groove may be disposed radially outside of the connector. The axial portion may be sealed to the piston.

In embodiments, the seal plate, the piston, and the front cover may define an apply chamber therebetween. In embodiments, the hybrid module may include a hub non-rotatably connected to the front cover. The piston may be sealed to the hub at an inner diameter thereof. The seal plate, the piston, the front cover, and the hub may define an apply chamber therebetween. The seal plate may be radially spaced from the hub. In embodiments, the clutch assembly may be arranged external to the torque converter.

Embodiments disclosed herein further provide a hybrid module including a hub, a torque converter, a clutch assembly, and a seal. The torque converter includes a front cover non-rotatably connected to the hub. The clutch assembly is arranged external to the torque converter. The clutch assembly includes a seal plate non-rotatably connected to the front cover and radially spaced from the hub. The seal is compressed between the seal plate and the front cover.

In embodiments, the seal plate may include a groove. The seal may be disposed in the groove. The seal plate may include a radial portion non-rotatably connected to the front cover via a connector. The groove may be disposed radially outside of the connector. The seal plate may include a step radially aligned with the groove. The step may extend axially away from the front cover. The step may be disposed radially outside of the connector.

Embodiments disclosed herein further provide a clutch assembly for a hybrid module including a clutch pack, a piston, and a seal plate. The piston is axially slidable to engage the clutch pack. The seal plate is sealed to the piston and configured to be non-rotatably connected to a torque converter. The seal plate includes a groove configured to face the torque converter and receive a seal.

In embodiments, the piston may be configured to be sealed to a hub, and the seal plate may be configured to be radially spaced from the hub.

Embodiments disclosed herein provide the advantageous benefit of reduced costs and complexity of hybrid modules, for example, by removing a weld that typically seals a seal plate of a clutch assembly to a front cover of a torque converter. Furthermore, embodiments disclosed herein offer design advantages by creating an apply chamber in a clutch assembly without bends in a front cover of a torque converter and with a seal plate of a reduced size.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
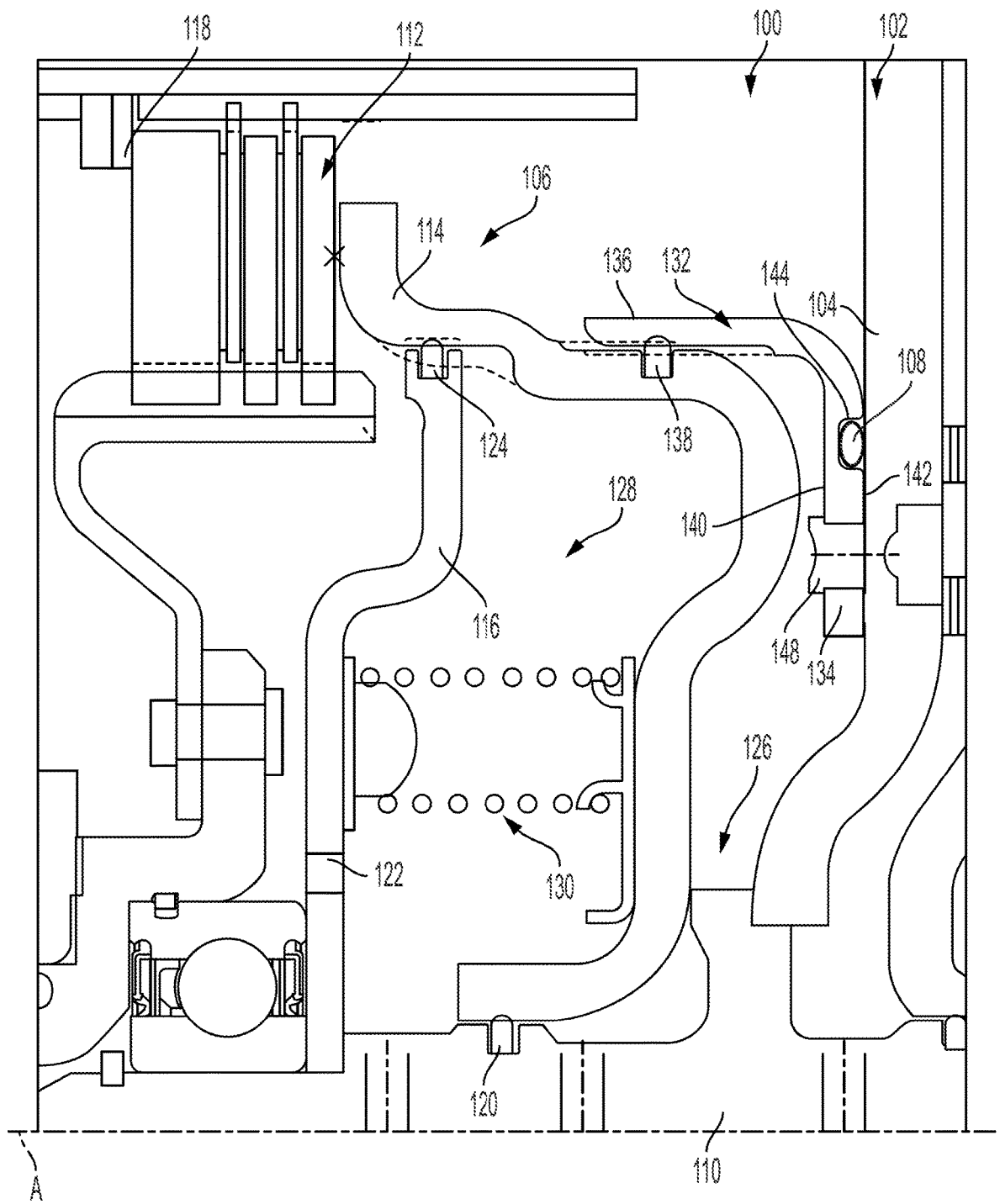
FIG. 1 illustrates portion of a hybrid module according to an embodiment of the present disclosure.

Referring to FIG. 1, a portion of a hybrid module 100 is illustrated according to one embodiment of the present disclosure. At least some portions of the hybrid module 100 are rotatable about a central axis A. While only a portion of the hybrid module 100 above the central axis A is shown in FIG. 1, it should be understood that the hybrid module 100 can appear substantially similar below the central axis A with many components extending about the central axis A. Words such as "axial," "radial," "circumferential," "outward," etc. as used herein are intended to be with respect to the central axis A.

The hybrid module 100 includes: a torque converter 102 having a front cover 104; a clutch assembly 106; a seal 108; and a hub 110. The front cover 104 is non-rotatably connected to the hub 110. The torque converter 102 may further include a turbine (not shown) having a turbine shell and at least one blade attached thereto, and an impeller (not shown) having an impeller shell and at least one blade attached thereto. The impeller shell may be fixed to the front cover 104, e.g., via a weld. The impeller shell and the front cover 104 may define a housing, or enclosure, for the torque converter 102. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The clutch assembly 106 includes a clutch pack 112, a piston 114, a balance dam 116, and a snap ring 118. The snap ring 118 is fixed relative to the hub 110. The piston 114 is axially slidable on the hub 110 to clamp the clutch pack 112 against the snap ring 118 to close the clutch assembly 106. The balance dam 116 may be fixed to the hub 110, e.g., via staking. In such an example, the balance dam 116 may be sealed to the hub 110 at the staking. The balance dam 116 is disposed axially between the snap ring 118 and the piston 114. The balance dam 116 may include a cooling flow orifice 122 configured to allow cooling flow through the balance dam 116 to the clutch pack 112.

The balance dam 116 is sealed to the piston 114 at an outer diameter thereof via a seal 124. The piston 114 is sealed to the hub 110 at an inner diameter thereof via a seal 120. The seal 120 maintains a fluid separation between an apply chamber 126 and a balance chamber 128. The balance chamber 128 is defined by, or bounded between, the hub 110, the seal 120, the piston 114, the seal 124, and the balance dam 116. By "bounded in part," we mean that a portion of the cited chamber, flow path, or other structure is bounded, or formed, by the cited element.

The clutch assembly 106 may include a resilient element 130 disposed axially between the piston 114 and the balance dam 116 urging the piston 114 away from the balance dam 116. In the example embodiment shown, the resilient element 130 includes coil springs disposed about a circumference arranged radially outside of the cooling flow orifice 122. Although coil springs are shown, other resilient elements are possible, e.g., a Belleville washer or a rubber puck.

The clutch assembly 106 further includes a seal plate 132. The seal plate 132 includes a radial portion 134 and an axial portion 136 extending axially from the radial portion 134. The radial portion 134 is non-rotatably connected to the front cover 104 via a connector 148, e.g., a fastener such as a rivet. The axial portion 136 is sealed to the piston 114 via a seal 138. The piston 114 is axially slidable relative to the seal plate 132 to open and close the clutch assembly 106.

The radial portion 134 includes a first axial side 140 facing the front cover 104 and a second axial side 142 facing the piston 114. The first axial side 140 includes a groove 144 extending towards the second axial side 142. The groove 144 may be disposed radially outside of the connector 148.

The seal 108 is disposed between the seal plate 132 and the front cover 104. Specifically, the seal 108 is disposed in the groove 144. The seal 108 is configured to be compressed by the seal plate 132 and the front cover 104. The seal 108 may, for example, be an O-ring, as shown in the Figures. As another example, the seal 108 may be a liquid seal, such as a room-temperature vulcanizing silicone. As yet another example, the seal 108 may be a gasket. In such an example, friction paper or rings may further be attached to the front cover 104 and/or the seal plate 132, e.g., in the groove 144. For example, friction materials (facings) may be attached to the front cover 104 and the seal plate 132 may act as a friction surface for the friction facings. The seals 108, 120, 138 maintain a fluid separation between the apply chamber 126 and the rest of the clutch assembly 106. The apply chamber 126 is defined by, or bounded between, the hub 110, the seal 108, the seal plate 132, the seal 138, the piston 114, and the seal 120. Hydraulic pressure in the apply chamber 126 is increased to move the piston 114 towards clutch pack 112, pressing the clutch pack 112 against snap ring 118 to engage (or close) the clutch assembly 106.

Compressing the seal 108 between the seal plate 132 and the front cover 104 allows for creating the apply chamber 126 without welds or bonded seals, which can reduce costs and complexity of the hybrid module 100. Furthermore, the embodiments disclosed herein reduces an envelope of the clutch assembly 106, which can assist in packaging the clutch assembly 106 in smaller envelopes for the hybrid module 100.

Figure 2:
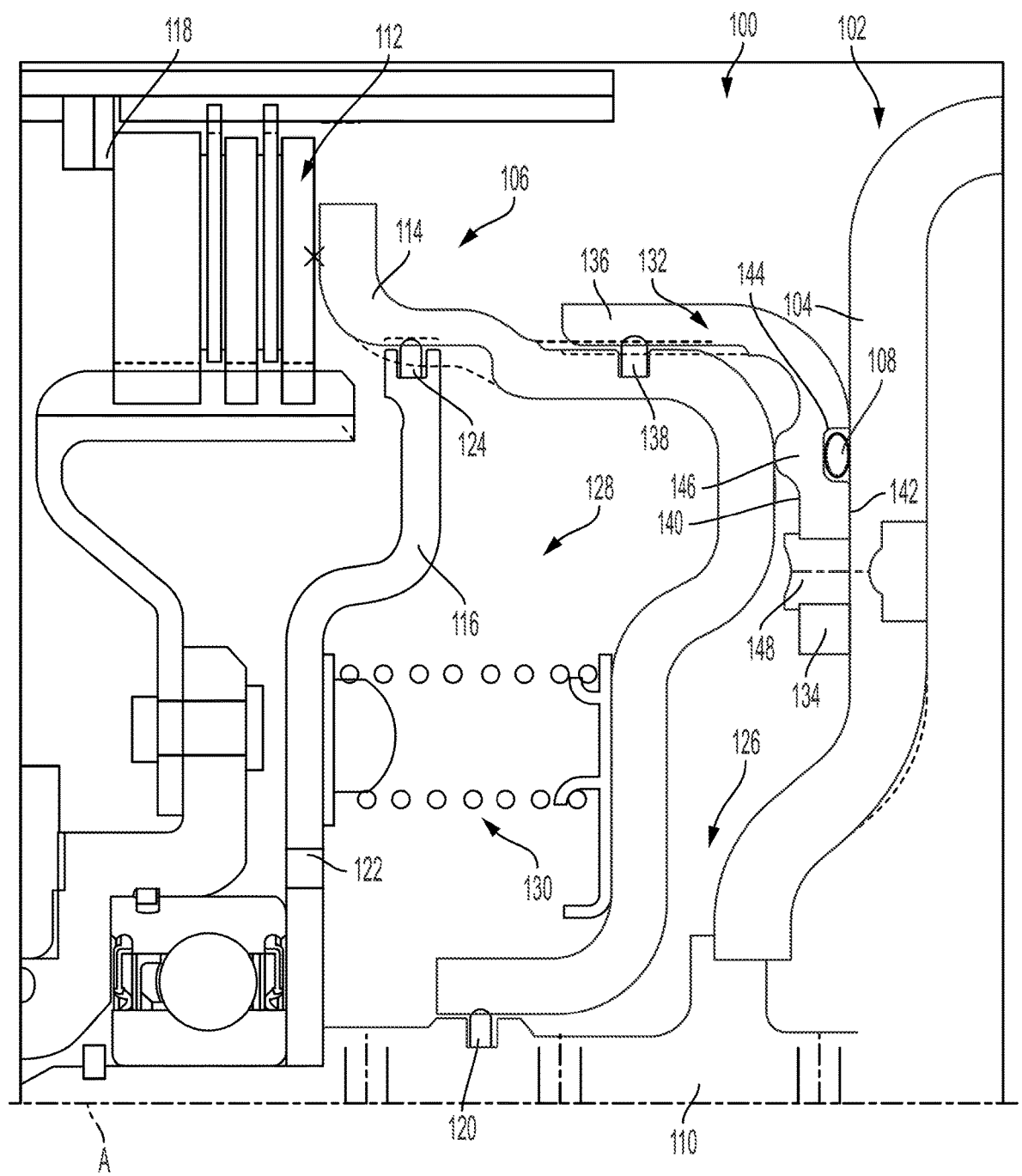
FIG. 2 illustrates portion of a hybrid module according to another embodiment of the present disclosure.

Referring to FIG. 2, an alternative embodiment for a hybrid module is provided. In contrast to FIG. 1, the radial portion 134 of the seal plate 132 includes a step 146. The step 146 extends axially from the second axial side 142 towards the piston 114. The step 146 may be arranged radially outside of the connector 148. The step 146 may, for example, be radially aligned with the groove 144. For example, the step 146 and the groove 144 may be formed by stamping and then machined for desired finished surfaces.

The step 146 may be configured to limit axial movement of the piston 114 towards the front cover 104. For example, the piston 114 may slide towards the front cover 104 to disengage (or open) the clutch assembly 106. In this situation, the piston 114 may contact the step 146, and the step 146 may prevent the piston 114 move sliding further towards the front cover 104. Providing the step 146 limits axial movement of the piston 114, which can assist in controlling flow through the cooling flow orifice 122.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 hybrid module
102 torque converter
104 front cover
106 clutch assembly
108 seal
110 hub
112 clutch pack
114 piston
116 balance dam
118 snap ring
120 seal
122 cooling flow orifice
124 seal
126 apply chamber
128 balance chamber
130 resilient element
132 seal plate
134 radial portion
136 axial portion
138 seal
140 axial side
142 axial side
144 groove
146 step
148 connector
A central axis

What is claimed is:

1. A hybrid module, comprising:
a torque converter including a front cover;
a clutch assembly including:
   a piston axially spaced from the front cover, the piston being axially slidable to engage the clutch assembly; and
   a seal plate non-rotatably connected to the front cover and sealed to the piston; and
a seal compressed between the seal plate and the front cover.

2. The hybrid module of claim 1, wherein the seal plate includes a radial portion and an axial portion extending axially therefrom, the seal being compressed by the radial portion.

3. The hybrid module of claim 2, wherein the radial portion includes an axial side facing the front cover and having a groove, the seal being disposed in the groove.

4. The hybrid module of claim 3, wherein the radial portion includes a further axial side opposite the axial side and facing the piston, the further axial side including a step extending axially therefrom.

5. The hybrid module of claim 4, wherein the step is configured to limit axial movement of the piston towards the front cover.

6. The hybrid module of claim 4, wherein the step is axially aligned with the groove.

7. The hybrid module of claim 4, wherein the radial portion is non-rotatably connected to the front cover via a connector, the step being disposed radially outside of the connector.

8. The hybrid module of claim 3, wherein the radial portion is non-rotatably connected to the front cover via a connector, the groove being disposed radially outside of the connector.

9. The hybrid module of claim 2, wherein the axial portion is sealed to the piston.

10. The hybrid module of claim 1, wherein the seal plate, the piston, and the front cover define an apply chamber therebetween.

11. The hybrid module of claim 1, further comprising a hub non-rotatably connected to the front cover, the piston being sealed to the hub at an inner diameter thereof, wherein the seal plate, the piston, the front cover, and the hub define an apply chamber therebetween.

12. The hybrid module of claim 11, wherein the seal plate is radially spaced from the hub.

13. The hybrid module of claim 1, wherein the clutch assembly is arranged external to the torque converter.

14. A hybrid module, comprising:
a hub;
a torque converter including a front cover non-rotatably connected to the hub;
a clutch assembly arranged external to the torque converter, the clutch assembly including a seal plate non-rotatably connected to the front cover and radially spaced from the hub; and
a seal compressed between the seal plate and the front cover.

15. The hybrid module of claim 14, wherein the seal plate includes a groove, the seal being disposed in the groove.

16. The hybrid module of claim 15, wherein the seal plate includes a radial portion non-rotatably connected to the front cover via a connector, the groove being disposed radially outside of the connector.

17. The hybrid module of claim 15, wherein the seal plate includes a step radially aligned with the groove, the step extending axially away from the front cover.

18. The hybrid module of claim 17, wherein the seal plate includes a radial portion non-rotatably connected to the front cover via a connector, the step being disposed radially outside of the connector.

19. A clutch assembly for a hybrid module, comprising:
a clutch pack;
a piston axially slidable to engage the clutch pack; and
a seal plate sealed to the piston and configured to be non-rotatably connected to a torque converter, the seal plate including a groove configured to face the torque converter and receive a seal.

20. The clutch assembly of claim 19, wherein the piston is configured to be sealed to a hub, and the seal plate is configured to be radially spaced from the hub.

* * * * *